(12) United States Patent
Finnell

(10) Patent No.: US 9,666,103 B2
(45) Date of Patent: May 30, 2017

(54) CONDUIT IDENTIFICATION SYSTEM

(71) Applicant: Indiana University Research and Technology Corporation, Indianapolis, IN (US)

(72) Inventor: John Finnell, Zionsville, IN (US)

(73) Assignee: Indiana University Research and Technology Corporation, Indianapolis, IN (US)

(*) Notice: Subject to any disclaimer, the term of this patent is extended or adjusted under 35 U.S.C. 154(b) by 0 days.

(21) Appl. No.: 14/984,694

(22) Filed: Dec. 30, 2015

(65) Prior Publication Data

US 2016/0111026 A1  Apr. 21, 2016

Related U.S. Application Data

(63) Continuation of application No. 14/384,818, filed as application No. PCT/US2013/031645 on Mar. 14, 2013, now Pat. No. 9,228,680.

(60) Provisional application No. 61/693,119, filed on Aug. 24, 2012, provisional application No. 61/622,641, filed on Apr. 11, 2012, provisional application No. 61/610,689, filed on Mar. 14, 2012.

(51) Int. Cl.
| | |
|---|---|
| *F16L 55/00* | (2006.01) |
| *G09F 3/00* | (2006.01) |
| *F16L 3/223* | (2006.01) |
| *F16L 11/12* | (2006.01) |
| *G09F 3/04* | (2006.01) |

(52) U.S. Cl.
CPC ............ *G09F 3/0295* (2013.01); *F16L 3/223* (2013.01); *F16L 11/124* (2013.01); *F16L 55/00* (2013.01); *G09F 3/04* (2013.01); *F16L 2201/60* (2013.01); *H02G 2200/20* (2013.01)

(58) Field of Classification Search
CPC . F16L 11/124; F16L 2201/60; H02G 2200/20
USPC ........ 138/104, 106; 174/112, 650, 653, 668; 40/316, 667, 666; 604/174, 173
See application file for complete search history.

(56) References Cited

U.S. PATENT DOCUMENTS

| | | | |
|---|---|---|---|
| 2,031,229 | A | 10/1936 | Roth |
| 4,292,749 | A | 10/1981 | Thomas |
| 4,641,443 | A | 2/1987 | Wilmes |
| 4,874,084 | A | 10/1989 | Strausser |
| 5,115,586 | A | 5/1992 | Hawker |
| 5,974,708 | A | 11/1999 | Webb et al. |
| 6,211,117 | B1 | 4/2001 | Haggerty et al. |
| 6,458,104 | B2 | 10/2002 | Gautsche |
| 7,073,282 | B2 | 7/2006 | Savagian |
| 7,347,015 | B2 | 3/2008 | Keeb |
| 7,745,740 | B2 | 6/2010 | Smith |

(Continued)

OTHER PUBLICATIONS

International Search Report and Written Opinion corresponding to PCT Application No. PCT/US2013/031645, mailed May 30, 2013, 10 pages.

*Primary Examiner* — Patrick F Brinson
(74) *Attorney, Agent, or Firm* — Faegre Baker Daniels LLP

(57) ABSTRACT

An identifier for a conduit includes a substrate having a pair of apertures. The substrate further contains a frangible portion encompassing one of the apertures and having a shape that corresponds to an opening left in the substrate after removal of the frangible portion. The identifier enables the shape of the frangible portion to be correlated with the shape of the opening left in the substrate after the frangible portion is separated from the substrate.

20 Claims, 4 Drawing Sheets

(56) References Cited

U.S. PATENT DOCUMENTS

| | | |
|---|---|---|
| 7,779,566 B2 | 8/2010 | Kassouni |
| 2005/0268435 A1 | 12/2005 | Moughelbay |
| 2007/0088286 A1 | 4/2007 | Brier |
| 2008/0189995 A1 | 8/2008 | Boire |
| 2009/0139743 A1 | 6/2009 | Smith |
| 2009/0241384 A1 | 10/2009 | Duffy |
| 2009/0277055 A1 | 11/2009 | Madrigal et al. |
| 2011/0086540 A1 | 4/2011 | Bierce |
| 2012/0260543 A1 | 10/2012 | Dunn |

CONDUIT IDENTIFICATION SYSTEM

CLAIM OF PRIORITY

This application claims priority from U.S. Provisional Application No. 61/610,689, which is entitled "Apparatus, System and Method for Labeling Lines and Tubing in a Healthcare Setting," and was filed on Mar. 14, 2012.

This application further claims priority from U.S. Provisional Application No. 61/622,641, which is entitled "Intravenous Tubing Identification System," and was filed on Apr. 11, 2012.

Additionally, this application claims priority from U.S. Provisional Application No. 61/693,119, which is entitled "Intravenous Tubing Identification System," and was filed on Aug. 24, 2012.

CROSS-REFERENCE TO RELATED APPLICATIONS

This application is a continuation application of U.S. patent application Ser. No. 14/384,818, which is entitled "Conduit Identification System," and was filed on Sep. 12, 2014, which is a 371 US national entry of PCT/US2013/031645, filed Mar. 14, 2013, the entire disclosures of which is expressly incorporated herein by reference in its entirety.

TECHNICAL FIELD

The present disclosure relates generally to identification systems, and more particularly, to identification systems for conduits.

BACKGROUND

Conduits of a variety of types are used in delivering an electrical signal, electrical power, or a substance over a distance. Often, numerous conduits are used in close proximity to one another to deliver a plurality of signals, power, or substances between locations. Tracing the plurality of conduits can be difficult, particularly when the conduits become entangled or obscured from view for a portion of the distance over which they travel.

In particular, conduits used in a healthcare setting, such as intravenous ("IV") tubes, can provide challenges to tracking the various substances delivered to a patient. A patient undergoing treatment in a healthcare setting, such as an emergency room, ambulance, critical care unit, nursing home, or outpatient clinic, may be connected to numerous electronic lead lines and medical tubing for collecting vital information and delivering essential nutrition and therapies. IV reservoir bags hanging on poles next to the patient's bed contain important nutrition, treatments, and therapies to be delivered to the patient through clear plastic IV tubing. This tubing typically passes through IV pumps before being sent directly to the IV site on the patient, where the fluid enters the patient's blood stream.

Healthcare professionals regularly monitor the patient's vital signs, as well as the nutrition and therapy levels delivered through IV tubing. In addition, healthcare professionals must regularly check and replace IV connections at various connection sites to change or replenish the nutrition and therapies being provided to the patient. Connections at the IV site on the patient must be changed at least every 72 hours to reduce the risk of infection.

These tasks can be challenging given the plurality of leads, tubing, and devices that can be associated with the patient and that can become entangled with one another. Healthcare professionals must follow tubing from one connection point to the other, weaving through a maze of tubing, to ensure that the correct nutrition or therapy is applied. The time required for tracking the path of a tube or line can be significant, and, in rare instances, may lead to errors in the configuring of the tubes and sources. Consequently, the plethora of electronic lead lines, tubes, and medical devices in proximity to the patient presents challenges for patient care.

In other environments, electrical cables, both signal and power cables, often extend over a substantial distance. In some instances, for example, wiring positioned within walls of a structure or underground is obscured from view for at least a portion of the distance over which the wiring extends. Once the wires are placed in the walls and covered, identifying cables at different locations can only be done using specialized electrical equipment that can detect a signal at each location of the cable. In other environments, such as a home computer or home theater arrangement, a user may have a substantial number of power and signal cables located within a small area. The cables can become entangled, and substantial effort can be required to identify the cables at each end.

To address these issues, users have been known to apply pieces of tape with handwritten identifiers to the cables or tubing. However, the adhesive on the tape can lose its tackiness and the tape fall off the cable or the handwritten identifiers may become illegible. In addition, tapes and adhesives can leave sticky residues causing cables or tubing to bunch and become even more entangled. A more robust system for identifying conduits is therefore desirable.

SUMMARY

In one embodiment, an identifier for a conduit enables quick and accurate identification of the conduit at different locations along the conduit. The identifier includes a substrate having a pair of apertures, each of which is configured to receive a conduit having a predetermined perimeter. The identifier further includes a frangible portion of the substrate encompassing one of the apertures in the substrate. The frangible portion has a shape that corresponds to an opening left in the substrate by separation of the frangible portion from the substrate.

In another embodiment, a set of identifiers facilitates identifying a conduit at different locations along the conduit. The set of identifiers includes a substrate having a first tag and a second tag. The first tag has a first pair of apertures, each of which is configured to receive a conduit having a predetermined perimeter, and a first frangible portion. The first frangible portion encompasses a first aperture of the first pair of apertures. The first frangible portion has a first shape that corresponds to a first opening left in the first tag by separation of the first frangible portion from the first tag. The second tag has a second pair of apertures, each of which is configured to receive the conduit having the predetermined perimeter, and a second frangible portion. The second frangible portion encompasses a first aperture of the second pair of apertures and has a second shape that corresponds to a second opening left in the second tag by separation of the second frangible portion from the second tag. The first shape is different from the second shape.

In yet another embodiment, a set of identifiers enables identification of a conduit at different locations along the length of the conduit. The set of identifiers includes a plurality of tags formed within a substrate such that each tag is configured for separation from other tags in the plurality of tags. Each tag in the plurality of tags includes a pair of apertures formed in the substrate, each of which is configured to receive a conduit having a predetermined perimeter, and a frangible portion encompassing a first aperture of the pair of apertures in the substrate. The frangible portion of each tag has a shape that corresponds to an opening left in the substrate of the tag by separation of the frangible portion from the substrate of the tag.

In another embodiment a method facilitates quick and accurate identification of different locations along a conduit. The method includes separating a frangible portion of an identifier tag having a pair of apertures from a remaining portion of the identifier tag, the frangible portion including a first aperture of the pair of apertures and the remaining portion including the remaining aperture in the pair of apertures. The method further includes receiving a conduit having a predetermined perimeter in the first aperture of the frangible portion at a first location of the conduit, receiving the conduit in the remaining aperture of the remaining portion at a second location of the conduit, and identifying the tube at the first location and the second location by correlating a shape of the frangible portion of the identifier tag with an opening left in the remaining portion left by separation of the frangible portion of the identifier tag.

DETAILED DESCRIPTION

Figure 1:
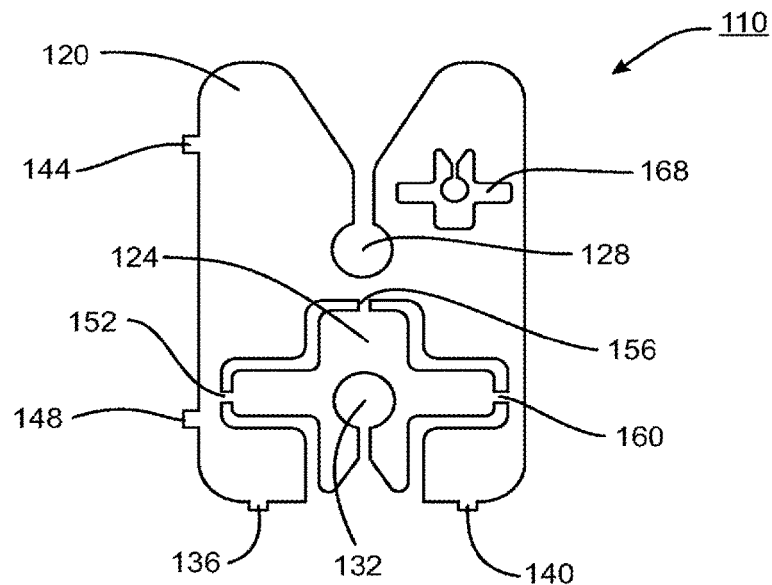
FIG. 1 is a top view of an identifier tag.

The description below and the accompanying figures provide a general understanding of the environment for the apparatus described herein as well as the details for use of the apparatus. In the drawings, like reference numerals are used throughout to designate like elements.

As used herein, the term "conduit" refers to a passage that carries a substance, electrical signal, or electrical power from one location to another. A conduit can refer to a cable or wire that transmits electrical power or an electrical signal, such as an HD VII, DV I, data, phone, USB, Ethernet, or audio cable. In other instances, a conduit can refer to a tube or a hose that carries a liquid or gas from one location to another, for example an IV tube, a hose, or a pipe.

FIG. 1 depicts an identifier tag 110 to be used for identifying a conduit. The identifier tag 110 can be fabricated from a substrate of firm, but flexible material. Such materials include, but are not limited to, polypropylene, KEVLAR, acrylonitrile butadiene styrene plastic, plasticized polyvinyl chloride, polyethylene, numerous other plastics, rubber, aluminum, copper, and other suitable metals. The substrate includes a frangible portion 124 and a remaining portion 120. The remaining portion 120 includes a first aperture 128, while the frangible portion 124 includes a second aperture 132. In one embodiment the apertures 128, 132 are circular and sized receive an IV tube without interfering with the flow of a fluid in the tube. In other embodiments, the apertures are configured to receive an electrical cable, a hose, or a pipe.

The frangible portion 124 of the tag 110 is attached to the remaining portion 120 by one or more frangible connectors. In the embodiment of FIG. 1, the tag 110 includes three frangible connectors 152, 156, 160. Other embodiments use more or less than three connectors depending on the size and shape of the frangible portion and the material used for the tag. The frangible connectors 152, 156, 160 are small tabs that are easily broken by applying light pressure, which separates the frangible portion 124 from the remaining portion 120. In the embodiment of FIG. 1, the remaining portion 120 further includes an image 168 of the frangible portion 124 etched or printed on the surface of the substrate to enable the user to verify that the frangible portion 124 is correctly associated with the corresponding remaining portion 120.

Figure 2:
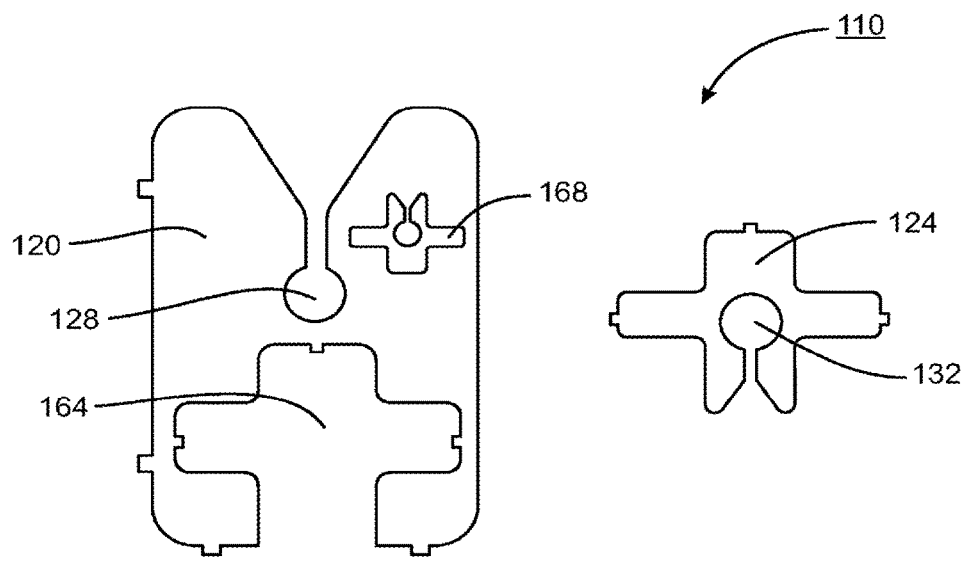
FIG. 2 is a top view of an identifier tag after a frangible portion is separated.

FIG. 2 illustrates the identifier tag 110 of FIG. 1 after the frangible portion 124 is separated from the remaining portion 120. The area within the remaining portion 120 where the frangible portion 124 was positioned before being separated from the identifier tag is now an opening 164. The shape of the opening 164 is substantially the same as the shape of the frangible portion 124, enabling a user to correlate the remaining portion 120 with the frangible portion 124 quickly and accurately. In addition, the image 168 of the frangible portion 124 on the remaining portion 120 enables an extra layer of verification to ensure that the remaining portion 120 is correlated with the matching frangible portion 124.

Figure 3:
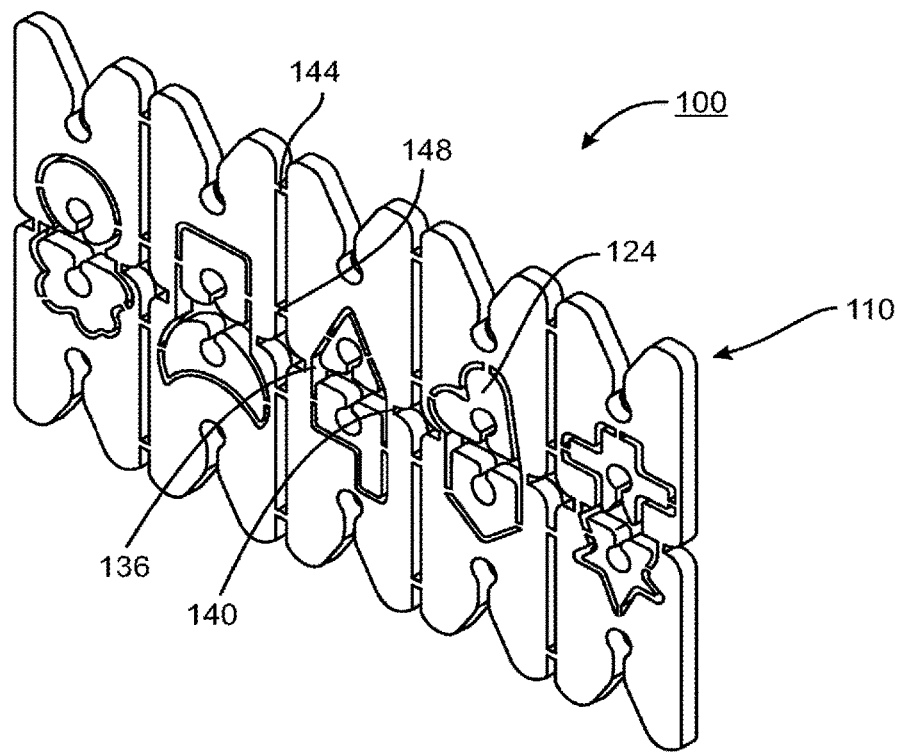
FIG. 3 is a top perspective view of an array of identifier tags.

FIG. 3 depicts an array 100 of identifier tags 110 formed within a single substrate. The embodiment of FIG. 3 includes five tags per row and two tags per column for a total of ten identifier tags 110. Each tag 110 is connected to horizontally adjacent tag(s) by horizontal connectors 144, 148 and to the vertically adjacent tag by vertical connectors 136, 140. The illustrated embodiment includes two connectors for each vertical and horizontal connection, although other embodiments can use more or less than two connectors per connection. The connectors 136, 140, 144, 148 are small frangible tabs that are easily broken by applying pressure or twisting the tag 110 about the connection to enable an individual tag 110 to be separated from the array 100.

Each tag 110 in the array of tags 100 includes a frangible portion 124 with a shape that is different from a shape of the frangible portion of every other tag 110 in the array 100. Thus, when the frangible portions 124 are removed, the remaining portions 120 each have a uniquely shaped opening and the frangible portions 124 each have a corresponding unique shape, enabling each frangible portion 124 to be correlated with the remaining portion 120 from which the frangible portion 124 was removed.

To use a tag 110, an individual tag 110 is separated from the array of tags 100 by breaking the horizontal and vertical connectors 136, 140, 144, and 148. The user then removes the frangible portion 124 by breaking the frangible connectors 152, 156, and 160. The frangible portion 124 and the remaining portion 120 are then attached to opposite ends of a single conduit, such as an IV tube or electrical cable, by fitting the conduit into the apertures 128 and 132 in the remaining portion 120 and frangible portion 124, respectively. The user can attach the remaining portion 120 and the frangible portion 124 directly to opposite ends of a conduit, or the user can attach both portions to the same place in a conduit, and slide the remaining portion 120 to one end of the conduit and the frangible portion 124 to the other end of the conduit to ensure that each portion of the tag is on the same conduit. The user is then able to identify each end of the same conduit by correlating the shape of the frangible portion 124 attached to one end of the conduit with the shape of the opening in the remaining portion 120 attached to the other end of the conduit.

In another embodiment, each tag in the array of tags can be colored differently than the other tags in the array. Thus, when used, the tags can be identified both by the color of the tag and the shape of the frangible portion and the remaining portion. In still another embodiment, multiple arrays of tags can be used, each of which is a different color. Therefore, in situations where more conduits are available for identification than shapes in an array, differently colored tags can be used to distinguish tags having frangible portions of the same shape.

Figure 4:
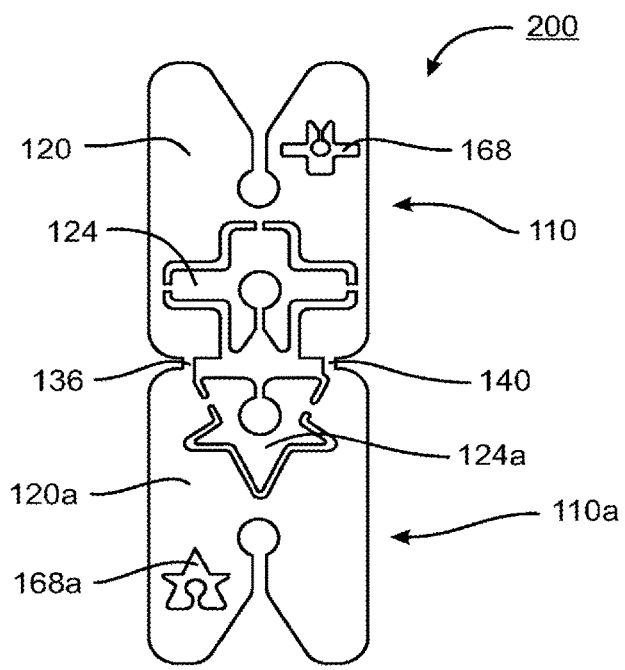
FIG. 4 is a top view of a pair of identifier tags.

Another embodiment is illustrated in FIG. 4, in which an array 200 includes two identifier tags 110 and 110*a* arranged vertically with respect to one another. Each tag 110 and 110*a* includes a frangible portion 124 and 124*a* and a remaining portion 120 and 120*a*. The frangible portion 124 of tag 110 has a shape that is different from a shape of the frangible portion 124*a* of tag 110*a*. Thus, the image 168 on remaining portion 120, corresponding to the frangible portion 124, is different from the image 168*a* on remaining portion 120*a*, corresponding to the frangible portion 124*a*. After the frangible portions 124 and 124*a* are removed, the user is easily able to identify the frangible portion 124 and 124*a* corresponding to the remaining portion 120 and 120*a* by correlating both the shape of the opening and the image 168 and 168*a* of the remaining portion 120 and 120*a* with the shape of the frangible portion 124 and 124*a*.

Figure 5:
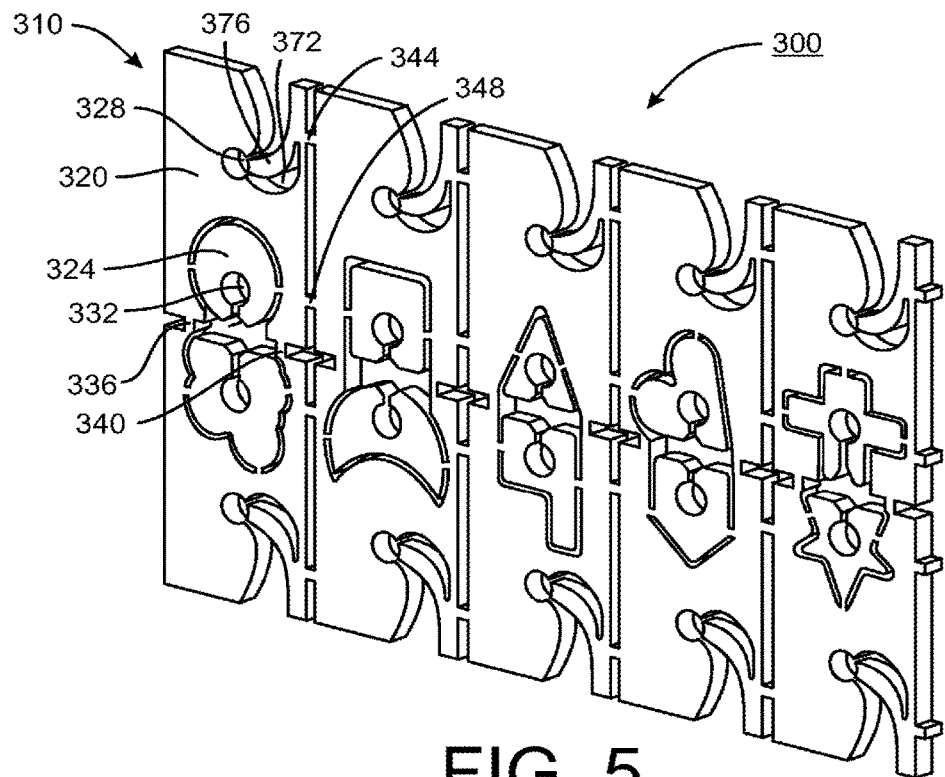
FIG. 5 is a top perspective view of an array of identifier tags having biasing members.

FIG. 5 illustrates another embodiment of an array 300 of identifier tags 310 formed within a single substrate. The array 300 of FIG. 5 includes five identifier tags 310 per row and two tags 310 per column, for a total of ten identifier tags 310. The identifier tags 310 are attached to each other by vertical connectors 336 and 340 and horizontal connectors 344 and 348. The vertical 336 and 340 and horizontal 344 and 348 connectors retain the tags 310 in the array 300 prior to use, and are configured to be frangible to facilitate quick manual removal of a single tag 310 from the array 300 by breaking the connectors 336, 340, 344. and 348.

Figure 6:
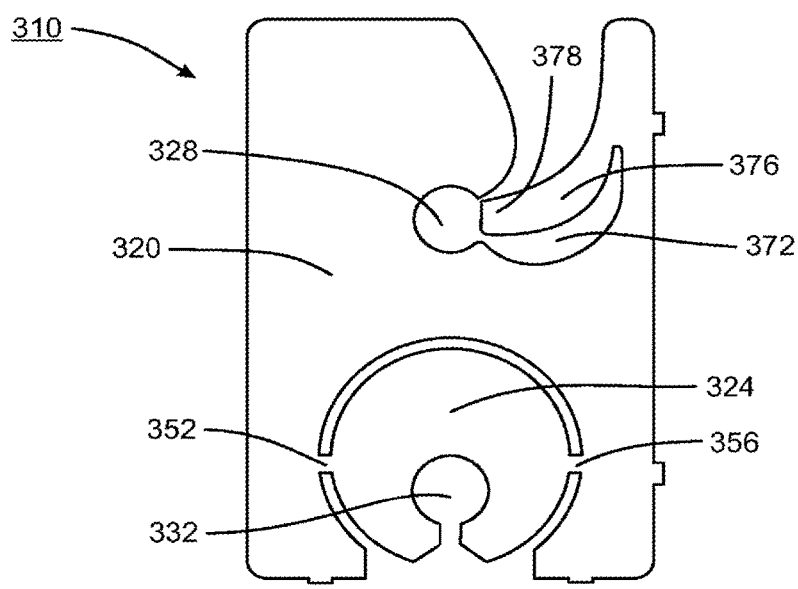
FIG. 6 is a top view of an identifier tag having a biasing member.
Figure 7:
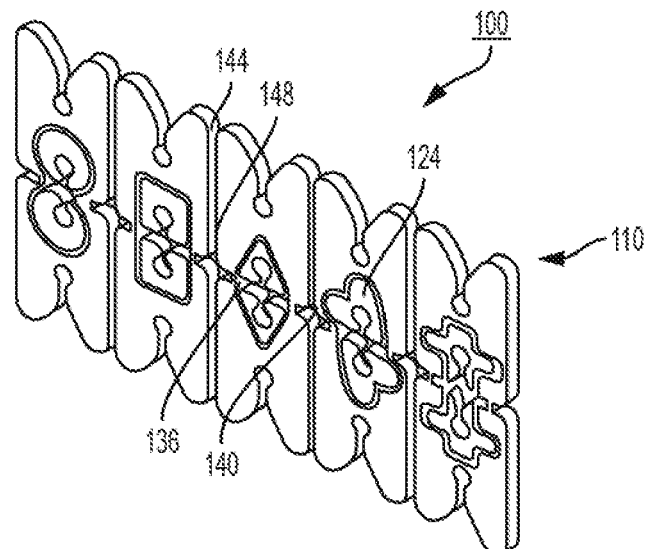
FIG. 7 is a top perspective view of an array of identifier tags where a characteristic of the identifying feature of a first tag is the same as a characteristic of the identifying feature of the second tag.
Figure 8:
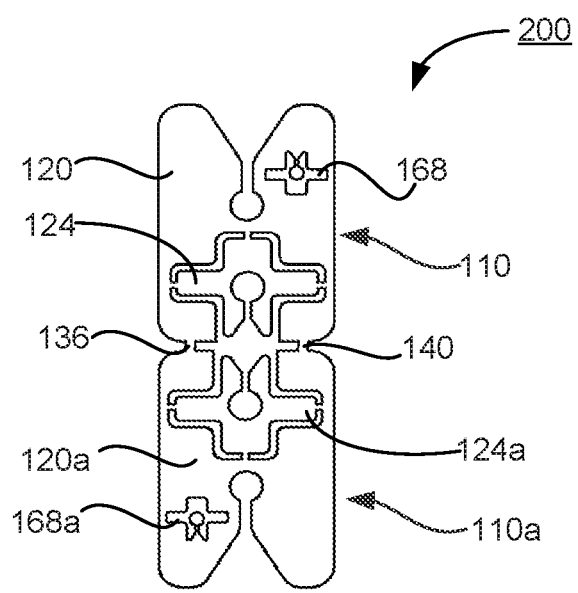
FIG. 8 is a top view of a pair of identifier tags where a characteristic of the identifying feature of a first tag is the same as a characteristic of the identifying feature of the second tag.

With reference to FIG. 6 and continuing reference to FIG. 5, each of the identifier tags 310 in the array 300 includes a frangible portion 324 having an opening 332 and a remaining portion 320, which includes two openings 328 and 372, and a biasing member 376. The frangible portion 324 is attached to the remaining portion 320 prior to use by frangible connectors 352 and 356. The connectors 352 and 356 are configured to break with light manual pressure to enable removal of the frangible portion 324. The frangible portion 324 of each tag 310 in the array 300 has a shape that is different from the shape of the other frangible portions to enable a user to differentiate the frangible portions and the corresponding remaining portions from one another. In the illustrated embodiment, the shapes of the frangible portions correspond to common shapes that can be described in short, simple words to enable quick and easy identification and communication of the symbols. For example, in the embodiment of FIG. 5, the various frangible portions are in the shape of a circle, a square, a triangle, a heart, a cross, a cloud, a crescent moon, a chair, a house, and a star. In some embodiments, the identifier tags 310 are each colored differently to add an additional component of verification to the correlation of the tags. In further embodiments, the frangible portions can have shapes that correspond to components connected to the conduit on which the tags are placed. For example, the frangible portions can be shaped like a computer, a monitor, a speaker, a printer, a video disc, or a television to simplify identification of electrical cables in a computer or home theater environment.

The remaining portion 320 of the identifier tag 310 includes a first aperture 328, a second aperture 372, and a biasing member 376 having a free end 378. The first aperture 328 is sized to fit around a conduit to enable the remaining portion 320 to remain in a fixed position on the conduit. The second aperture 372 is adjacent the first aperture 328 and the biasing member 376. The biasing member 376 is configured to deform elastically such that the free end 378 moves into the second aperture 372 to enable a conduit to be forced past the biasing member 376 and placed in the first aperture 328. After the conduit has been secured in the first aperture 328, the free end 378 of the biasing member 376 returns to the initial position, disabling removal of the conduit from the first aperture 328. While the illustrated embodiment depicts only the remaining portion as including a biasing member, the reader should appreciate that the frangible portion can also include a biasing member to prevent removal of the frangible portion from the conduit.

To use the identification system in a healthcare setting a user removes a single identification tag 310 from the array 300 of tags by breaking the vertical 336 and 340 and horizontal 344 and 348 connectors. The frangible portion 324 of the tag is then removed from the remaining portion 320 by breaking frangible connectors 352 and 356. The frangible portion 324 and remaining portion 320 are attached to opposite ends of an IV tube, enabling a user to identify the fluid fed to a particular tube by correlating the shape of the frangible portion 324 with the shape removed from the remaining portion 320. In situations where the patient may tamper with the identification tag or where the tag may fall off the IV tube, the remaining portion 320, having the biasing member 376, can be attached at the end near the patient or where the tag may fall off. The biasing member 376 is configured to deform into the second aperture 372 as an IV tube is inserted into the first aperture 328 of the remaining portion 320. The biasing member 376 moves back to the initial position after the IV tube is inserted in the first aperture 328, closing the aperture 328 where the IV tube rests and disabling removal of the remaining portion 320 from the IV tube. Once the IV tube is situated in the first aperture 328, the remaining portion 320 must be broken to remove the remaining portion 320 from the IV tube. Thus, the remaining portion 320 of the tag cannot fall off the tube and tampering with the tag 310 is easily detected.

To use the identification system on an electrical cable, a user removes a single tag 310 from the array of tags 300 and separates the frangible portion 324 in the same manner as described above. The frangible portion 324 and the remaining portion 320 are attached at opposite ends of an electrical power or signal cable to enable a user to identify both ends of a cable without necessitating testing the cable or tracing the cable from one end to the other. In situations where the identifiers could be tampered with, the remaining portion 320 of the tag 310 can be attached to the cable at the portion where the cable may be tampered with. When the remaining portion 320 is attached to the cable, the biasing member 376 blocks removal of the cable in a similar manner as described above. Thus, the tags cannot be moved or switched in a way that could cause issues during future maintenance and operation without the tampering being evident.

The reader should appreciate that, while the identification system has been described with reference to use in a medical or electrical environment, the conduit identification system can be used in other environments as well. For example, in one embodiment the identification system can be used to identify wires in an automobile and simplify tracking of wires running between various components and wiring, harnesses in the vehicle. In another embodiment, the identification system can be used to identify pipes or hoses in home, automotive, or industrial applications.

While the preferred embodiments have been illustrated and described in detail in the drawings and foregoing description, the same should be considered illustrative and not restrictive. All changes, modifications, and further applications are desired to be protected.

What is claimed is:

1. An identifier for a conduit, comprising:
   a first tag having a first aperture formed therein and including an opening at a first end and a frangible connector at a second end;
   a second tag having a second aperture formed therein and including an opening at a first end and a frangible connector at a second end; and
   wherein the first and second tags each include an identifying feature, and wherein a characteristic of the identifying feature of the first tag is the same as a characteristic of the identifying feature of the second tag.

2. The identifier of claim 1, wherein the first tag is connected in a column with the second tag via the frangible connector of the first tag and the first tag is separated from the column by breaking at least one frangible connection intermediate the first and second tags.

3. The identifier of claim 1, wherein the second tag is connected in a column with the first tag via the frangible connector of the second tag and the second tag is separated from the column by breaking at least one frangible connection intermediate the first and second tags.

4. The identifier of claim 1, wherein the first tag includes a first restriction adjacent the opening and the first aperture, wherein the first tag connects to the conduit when the conduit moves past the opening and the first restriction and into the first aperture.

5. The identifier of claim 1, wherein the second tag includes a second restriction adjacent the opening and the second aperture, wherein the second tag connects to the conduit when the conduit moves past the opening and the second restriction and into the second aperture.

6. The identifier of claim 1, wherein the identifying feature of the first and second tags correspond to common shapes to enable quick and easy identification of the first tag relative to the second tag and of the second tag relative to the first tag.

7. The identifier of claim 5, wherein the common shapes include at least one of a circle, a square, a triangle, and a cross.

8. The identifier of claim 1, wherein the identifying feature of the first tag has a first shape and the identifying feature of the second tag has a second shape that is the same as the first shape but larger than the first shape.

9. The identifier of claim 1, wherein the first tag includes a first tag color and the second tag includes a second tag color that matches the first tag color.

10. The identifier of claim 1, wherein the characteristic of the identifying feature of the first tag is a shape of the identifying feature, and wherein the characteristic of the identifying feature of the second tag is a shape of the identifying feature.

11. The identifier of claim 1, wherein the first tag and the identifying feature of the first tag is smaller than the second tag and the identifying feature of the second tag.

12. An array of identifiers for a plurality of conduits, comprising:
    a plurality of pairs of tags, each pair of tags including
       a first tag having a first aperture formed therein, and
       a second tag having a second aperture formed therein; and
    wherein the first and second tags each include an identifying feature, and wherein a characteristic of the identifying feature of the first tag is the same as a characteristic of the identifying feature of the second tag; and
    wherein a first tag of a pair of tags is connected in a column with a second tag of a pair of tags via a frangible connector of the first tag, and wherein the second tag of the pair of tags is connected in a column with the first tag of the pair of tags via a frangible connector of the second tag.

13. The array of identifiers of claim 12, wherein the first tag is separated from the column by breaking at least one frangible connection intermediate the first and second tags.

14. The array of identifiers of claim 13, wherein the second tag is separated from the column by breaking at least one frangible connection intermediate the first and second tags.

15. The array of identifiers of claim 14, wherein the at least one frangible connection comprises at least one of the frangible connector of the first tag and the frangible connector of the second tag.

16. The array of identifiers of claim 12, wherein the characteristic of the identifying feature of the first tag is a shape of the identifying feature, and wherein the characteristic of the identifying feature of the second tag is a shape of the identifying feature.

17. The array of identifiers of claim 12, wherein the first tag and the identifying feature of the first tag is smaller than the second tag and the identifying feature of the second tag.

18. The array of identifiers of claim 12, wherein the identifying feature of the first and second tags corresponds to a common shape to enable quick and easy identification of the first tag relative to the second tag and of the second tag relative to the first tag.

19. The array of identifiers of claim 18, wherein the common shape include at least one of a circle, a square, a triangle, and a cross.

20. The array of identifiers of claim 12, wherein the identifying feature of the first tag has a first shape and the identifying feature of the second tag has a second shape that is the same as the first shape but larger than the first shape.

* * * * *